United States Patent
Misra et al.

(10) Patent No.: US 10,157,223 B2
(45) Date of Patent: Dec. 18, 2018

(54) IDENTIFYING TRENDS ASSOCIATED WITH TOPICS FROM NATURAL LANGUAGE TEXT

(71) Applicant: Accenture Global Solutions Limited, Dublin (IE)

(72) Inventors: Janardan Misra, Bangalore (IN); Shubhashis Sengupta, Bangalore (IN); Sanjay Podder, Thane (IN); Robert E. Kress, Naperville, IL (US); Ashwin Menon, San Francisco, CA (US)

(73) Assignee: Accenture Global Solutions Limited, Dublin (IE)

( * ) Notice: Subject to any disclaimer, the term of this patent is extended or adjusted under 35 U.S.C. 154(b) by 291 days.

(21) Appl. No.: 15/144,277

(22) Filed: May 2, 2016

(65) Prior Publication Data

US 2017/0270193 A1  Sep. 21, 2017

(30) Foreign Application Priority Data

Mar. 15, 2016  (IN) .............................. 201641009077

(51) Int. Cl.
  *G06F 17/30*  (2006.01)
(52) U.S. Cl.
  CPC .. *G06F 17/30696* (2013.01); *G06F 17/30684* (2013.01)
(58) Field of Classification Search
  CPC ......... G06F 17/30684; G06F 17/30696; G06F 17/30; G06F 17/30554; G06F 17/30548; G06F 3/0481; G06F 3/04812; G06F 17/30424; G06F 17/28; G06F 9/44; G06F 17/30864; G06N 7/06; G06N 7/02; G06Q 30/02; G06Q 30/0202; G06Q 10/063; G06Q 30/0204
  See application file for complete search history.

(56) References Cited

U.S. PATENT DOCUMENTS

| | | | |
|---|---|---|---|
| 8,442,923 B2 | 5/2013 | Gross | |
| 8,874,571 B2 | 10/2014 | Whitney et al. | |
| 9,183,598 B2 | 11/2015 | Dey et al. | |
| 9,195,635 B2 | 11/2015 | Lui et al. | |
| 2002/0052730 A1* | 5/2002 | Nakao | G06F 17/27 704/10 |

(Continued)

FOREIGN PATENT DOCUMENTS

WO  WO 2009/134462 A2  11/2009

*Primary Examiner* — Anh Ly
(74) *Attorney, Agent, or Firm* — Harrity & Harrity, LLP

(57) ABSTRACT

A device may obtain text to be processed to identify a trend associated with a topic included in the text. The text may include a plurality of text sections, associated with the topic, that may be associated with a plurality of temporal intervals. The device may determine a respective context for the topic in each of the plurality of text sections. The device may calculate a first specificity score based on the respective context for the topic for one or more text sections associated with the first temporal interval. The device may calculate a second specificity score based on the respective context for the topic for one or more text sections associated with the second temporal interval. The device may identify a trend associated with the topic based on the first specificity score and the second specificity score, and may provide information that identifies the trend.

20 Claims, 11 Drawing Sheets

(56) References Cited

U.S. PATENT DOCUMENTS

| | | | |
|---|---|---|---|
| 2007/0179932 A1* | 8/2007 | Piaton | G06F 17/30696 |
| | | | 707/E17.082 |
| 2012/0130741 A1* | 5/2012 | Sparandara | G06Q 50/24 |
| | | | 705/3 |
| 2012/0131507 A1* | 5/2012 | Sparandara | G16H 10/60 |
| | | | 715/833 |
| 2012/0185544 A1* | 7/2012 | Chang | G06Q 50/01 |
| | | | 709/206 |
| 2013/0060930 A1* | 3/2013 | Ellis | G06Q 30/02 |
| | | | 709/224 |
| 2013/0110823 A1* | 5/2013 | Su | G06F 17/30867 |
| | | | 707/723 |
| 2015/0289120 A1* | 10/2015 | Harber | G06Q 50/01 |
| | | | 455/414.3 |

* cited by examiner

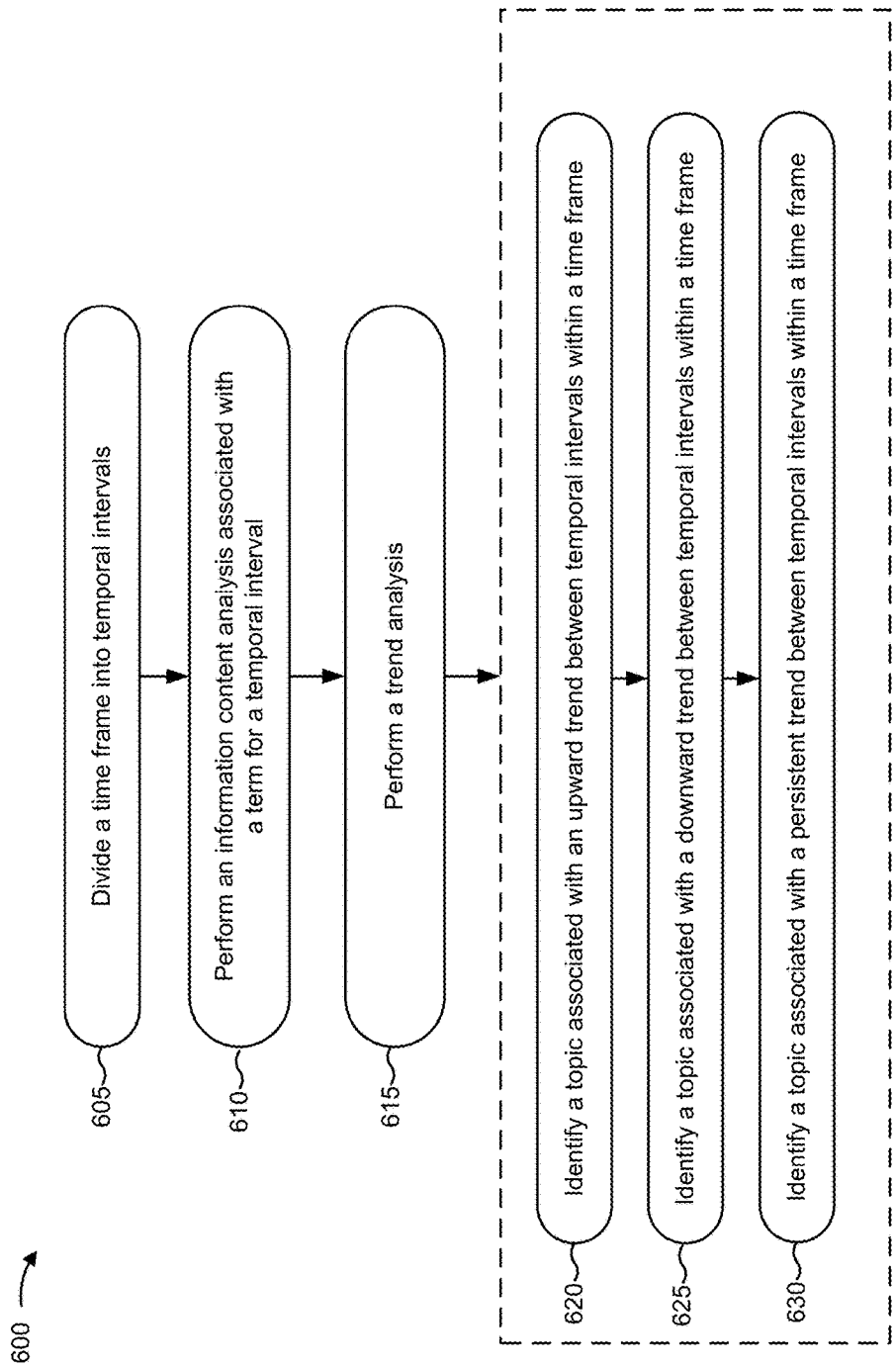

IDENTIFYING TRENDS ASSOCIATED WITH TOPICS FROM NATURAL LANGUAGE TEXT

RELATED APPLICATION

This application claims priority under 35 U.S.C. § 119 to Indian Patent Application No. 201641009077, filed on Mar. 15, 2016, the content of which is incorporated by reference herein in its entirety.

BACKGROUND

Text documents may include topics with different degrees of importance. Additionally, a topic may be associated with a trend, which may indicate a difference in importance of the topic across a particular time frame.

SUMMARY

In some possible implementations, a device may include one or more processors. The one or more processors may obtain text to be processed to identify a trend associated with a topic included in the text. The text may include a plurality of text sections associated with the topic. The plurality of text sections may be associated with a plurality of temporal intervals. The one or more processors may determine a respective context for the topic in each of the plurality of text sections. The one or more processors may calculate a first specificity score, associated with the topic for a first temporal interval, based on the respective context for the topic for one or more text sections, of the plurality of text sections, associated with the first temporal interval. The one or more processors may calculate a second specificity score, associated with the topic for a second temporal interval, based on the respective context for the topic for one or more text sections, of the plurality of text sections, associated with the second temporal interval. The plurality of temporal intervals may include the first temporal interval and the second temporal interval. The one or more processors may identify the trend associated with the topic based on the first specificity score and the second specificity score. The one or more processors may provide information that identifies the trend associated with the topic to permit an action to be taken based on the trend.

In some possible implementations, a non-transitory computer readable medium may store instructions. The instructions may cause a processor to obtain a plurality of text documents to be processed to identify a trend associated with a topic included in one or more of the plurality of text documents. The plurality of text documents may include a plurality of text sections associated with the topic. The plurality of text sections may be associated with a plurality of temporal intervals. The instructions may cause the processor to determine a respective context for the topic in each of the plurality of text sections. The instructions may cause the processor to calculate a first specificity score, associated with the topic for a first temporal interval, based on the respective context for the topic for one or more text sections, of the plurality of text sections, associated with the first temporal interval. The instructions may cause the processor to calculate a second specificity score, associated with the topic for a second temporal interval, based on the respective context for the topic for one or more text sections, of the plurality of text sections, associated with the second temporal interval. The instructions may cause the processor to identify the trend associated with the topic based on the first specificity score and the second specificity score. The instructions may cause the processor to provide information that identifies the trend associated with the topic to cause an action to be taken based on the trend.

In some possible implementations, a method may include obtaining, by a device, text to be processed to identify a trend associated with a topic included in the text. The text may include a plurality of text sections associated with the topic. The plurality of text sections may be associated with a plurality of time frames. The method may include determining, by the device, a respective context for the topic in each of the plurality of text sections. The respective context for the topic in each of the plurality of text sections may include one or more terms that appear within a threshold distance of the topic. The method may include calculating, by the device, a first specificity score, associated with the topic for a first time frame, of the plurality of time frames, based on the respective context for the topic for one or more text sections, of the plurality of text sections, associated with the time frame. The method may include calculating, by the device, a second specificity score, associated with the topic for a second time frame, of the plurality of time frames, based on the respective context for the topic for one or more text sections, of the plurality of text sections, associated with the second time frame. The method may include identifying, by the device, the trend associated with the topic based on the first specificity score and the second specificity score. The method may include providing, by the device, information that identifies the trend associated with the topic to permit an action to be taken based on the trend.

BRIEF DESCRIPTION OF THE DRAWINGS

FIGS. 6A and 6B are flow charts of an example process for processing text to identify trends associated with topics included in the text.

DETAILED DESCRIPTION

The following detailed description of example implementations refers to the accompanying drawings. The same reference numbers in different drawings may identify the same or similar elements.

A group of text documents, such as audit, corporate, and/or legal documents, may include one or more topics which may represent concerns of an organization (e.g., may indicate risks). The text documents may be associated with different time periods, and a particular topic may be associated with a particular importance depending on the time period. For example, a topic may exhibit a trend across time periods (e.g., increase, decrease, or persist in importance). An analyst may attempt to manually identify trends associated with topics in the text documents and/or may attempt to identify topics that are associated with particular trends. However, manual identification of trends may be dependent on user knowledge of the information, may involve excessive manual work, may be error-prone, may be incomplete, or the like. Implementations described herein may utilize natural language processing to automatically identify trends associated with topics included in text documents, thereby increasing the speed and accuracy of trend identification.

Figure 1:
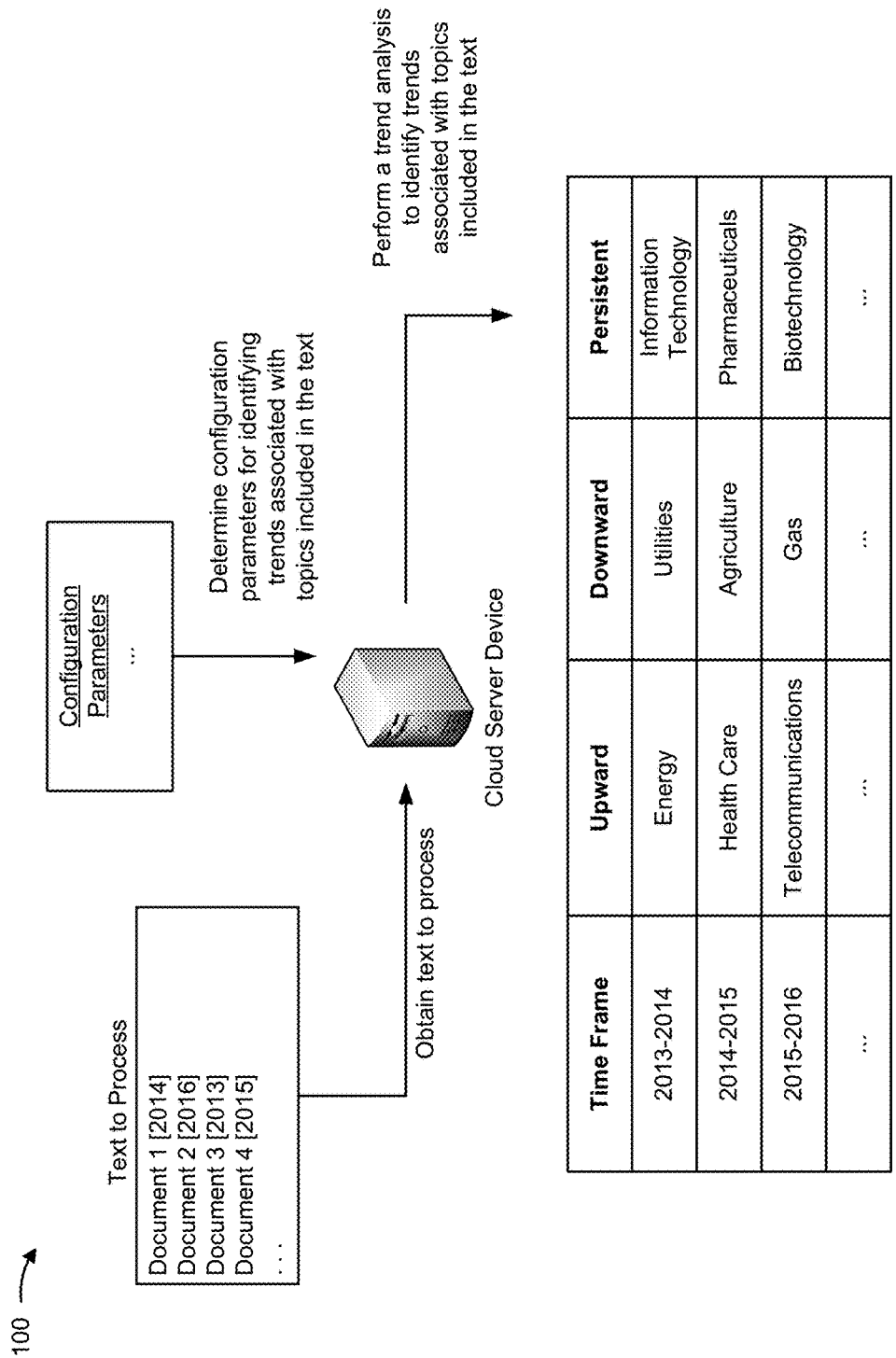
FIG. 1 is a diagram of an overview of an example implementation described herein.

FIG. 1 is a diagram of an overview of an example implementation 100 described herein. As shown in FIG. 1, a cloud server device may obtain text to be processed to identify trends associated with topics included in the text. For example, assume that the text includes multiple text documents that are associated with various temporal indicators (e.g., timestamps), identified as "Document 1 [2014]," "Document 2 [2016]," etc. As further shown, the cloud server device may determine configuration parameters to be used to identify trends associated with topics included in the text. The configuration parameters may include, for example, time frames for which to identify trends, a quantity of topics to be displayed, or the like.

As further shown in FIG. 1, the cloud server device may perform a trend analysis to identify trends associated with topics included in the text. As an example, the cloud server device may calculate specificity scores associated with topics included in the text, may calculate trend scores associated with topics included in the text, or the like, as described in more detail elsewhere herein. The cloud server device may identify trends associated with topics included in the text, and may provide information associated with the identified trends and topics for display (e.g., via a client device, such as a desktop computer). For example, as shown, the cloud server device may identify topics (e.g., "Energy," "Health Care," and "Telecommunications") that are associated with upward trends for a particular time frame (e.g., 2013-2014), which may signify that that topics increased in importance across the time frame.

In this way, the cloud server device may assist in identifying trends associated with topics included in the text, which may result in more accurate trend and/or topic identification, or the like. In some cases, an analyst may use the identified trends and/or topics to identify themes, risks, and/or concerns associated with an organization. Additionally, the cloud server device may permit and/or cause an action to be performed based on identifying a trend and/or a topic (e.g., may notify another device).

As indicated above, FIG. 1 is provided merely as an example. Other examples are possible and may differ from what was described with regard to FIG. 1.

Figure 2:
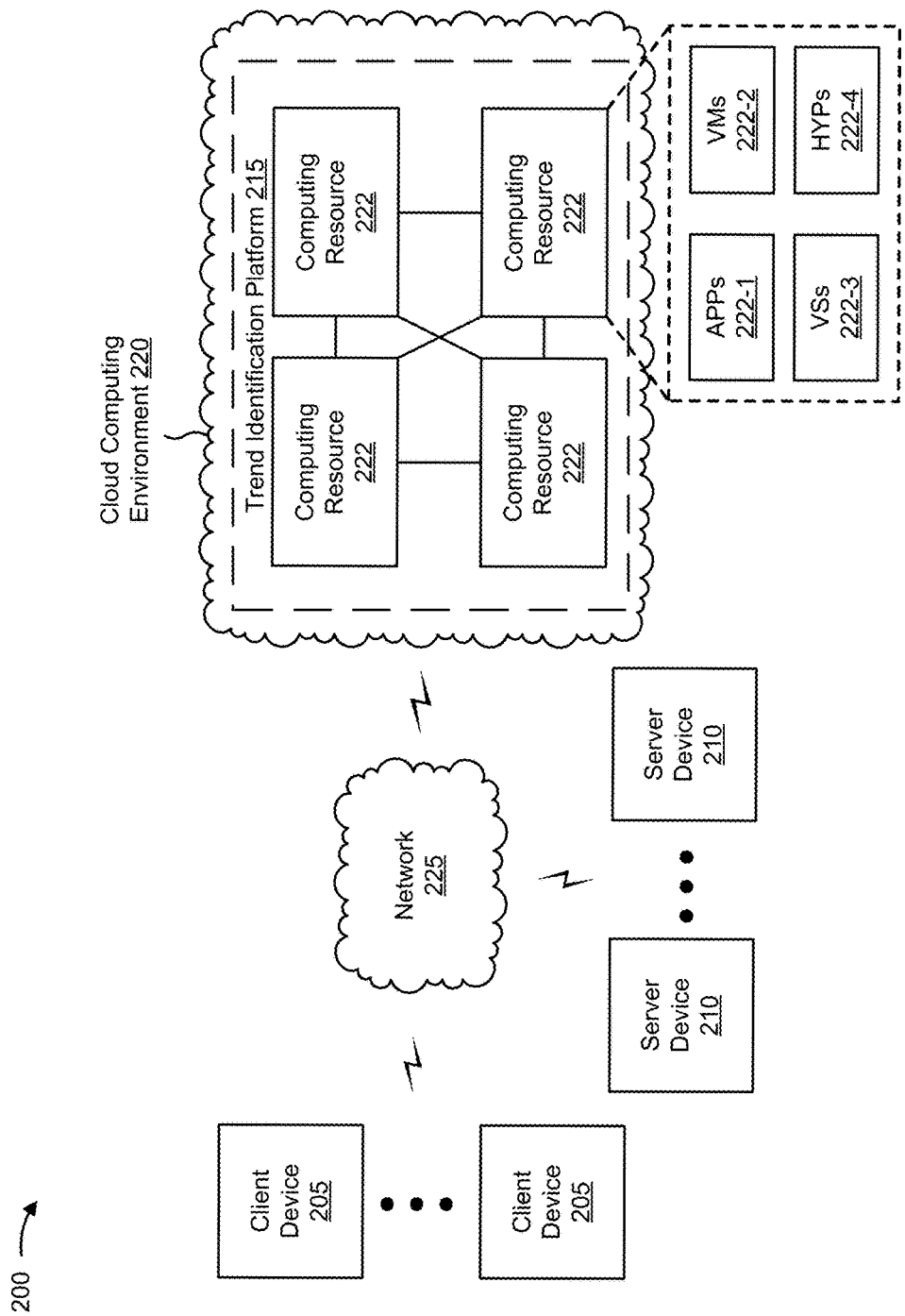
FIG. 2 is a diagram of an example environment in which systems and/or methods, described herein, may be implemented.

FIG. 2 is a diagram of an example environment 200 in which systems and/or methods described herein may be implemented. As shown in FIG. 2, environment 200 may include one or more client devices 205 (hereinafter referred to collectively as "client devices 205," and individually as "client device 205"), one or more server devices 210 (hereinafter referred to collectively as "server devices 210," and individually as "server device 210"), a trend identification platform 215 hosted within a cloud computing environment 220, and a network 225. Devices of environment 200 may interconnect via wired connections, wireless connections, or a combination of wired and wireless connections.

Client device 205 includes one or more devices capable of receiving, generating, storing, processing, and/or providing information associated with trend identification platform 215. For example, client device 205 may include a computing device, such as a desktop computer, a laptop computer, a tablet computer, a server device, a mobile phone (e.g., a smart phone or a radiotelephone) or a similar type of device.

Server device 210 includes one or more devices capable of receiving, storing, and/or providing information associated with text for use by trend identification platform 215. For example, server device 210 may include a server or a group of servers. In some implementations, trend identification platform 215 may obtain information associated with text, obtain text to be processed, or the like, from server device 210.

Trend identification platform 215 includes one or more devices capable of obtaining text to be processed, determining a context associated with a topic included in the text, calculating a specificity score, performing a trend analysis, identifying trends associated with topics included in the text, providing information associated with trends and/or topics, and/or permitting or causing an action to be performed based on an identified trend, as described elsewhere herein. For example, trend identification platform 215 may include a cloud server or a group of cloud servers. In some implementations, trend identification platform 215 may be designed to be modular such that certain software components can be swapped in or out depending on a particular need. As such, trend identification platform 215 may be easily and/or quickly reconfigured for different uses.

In some implementations, as shown, trend identification platform 215 may be hosted in cloud computing environment 220. Notably, while implementations described herein describe trend identification platform 215 as being hosted in cloud computing environment 220, in some implementations, trend identification platform 215 may not be cloud-based (i.e., may be implemented outside of a cloud computing environment) or may be partially cloud-based.

Cloud computing environment 220 includes an environment that hosts trend identification platform 215. Cloud computing environment 220 may provide computation, software, data access, storage, etc. services that do not require end-user (e.g., client device 205) knowledge of a physical location and configuration of system(s) and/or device(s) that hosts trend identification platform 215. As shown, cloud computing environment 220 may include a group of computing resources 222 (referred to collectively as "computing resources 222" and individually as "computing resource 222").

Computing resource 222 includes one or more personal computers, workstation computers, server devices, or another type of computation and/or communication device. In some implementations, computing resource 222 may host trend identification platform 215. The cloud resources may include compute instances executing in computing resource 222, storage devices provided in computing resource 222, data transfer devices provided by computing resource 222, etc. In some implementations, computing resource 222 may communicate with other computing resources 222 via wired connections, wireless connections, or a combination of wired and wireless connections.

As further shown in FIG. 2, computing resource 222 includes a group of cloud resources, such as one or more applications ("APPs") 222-1, one or more virtual machines ("VMs") 222-2, virtualized storage ("VSs") 222-3, one or more hypervisors ("HYPs") 222-4, or the like.

Application 222-1 includes one or more software applications that may be provided to or accessed by client device 205. Application 222-1 may eliminate a need to install and execute the software applications on client device 205. For example, application 222-1 may include software associated with trend identification platform 215 and/or any other software capable of being provided via cloud computing environment 220. In some implementations, one application 222-1 may send/receive information to/from one or more other applications 222-1, via virtual machine 222-2.

Virtual machine 222-2 includes a software implementation of a machine (e.g., a computer) that executes programs like a physical machine. Virtual machine 222-2 may be either a system virtual machine or a process virtual machine, depending upon use and degree of correspondence to any real machine by virtual machine 222-2. A system virtual machine may provide a complete system platform that supports execution of a complete operating system ("OS"). A process virtual machine may execute a single program, and may support a single process. In some implementations, virtual machine 222-2 may execute on behalf of a user (e.g., client device 205), and may manage infrastructure of cloud computing environment 220, such as data management, synchronization, or long-duration data transfers.

Virtualized storage 222-3 includes one or more storage systems and/or one or more devices that use virtualization techniques within the storage systems or devices of computing resource 222. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 222-4 may provide hardware virtualization techniques that allow multiple operating systems (e.g., "guest operating systems") to execute concurrently on a host computer, such as computing resource 222. Hypervisor 222-4 may present a virtual operating platform to the guest operating systems, and may manage the execution of the guest operating systems. Multiple instances of a variety of operating systems may share virtualized hardware resources.

Network 225 may include one or more wired and/or wireless networks. For example, network 225 may include a cellular network (e.g., a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 2 are provided as an example. In practice, there may be additional devices, fewer devices, different devices, or differently arranged devices than those shown in FIG. 2. Furthermore, two or more devices shown in FIG. 2 may be implemented within a single device, or a single device shown in FIG. 2 may be implemented as multiple, distributed devices. Additionally, one or more of the devices of environment 200 may perform one or more functions described as being performed by another one or more devices of environment 200.

Figure 3:
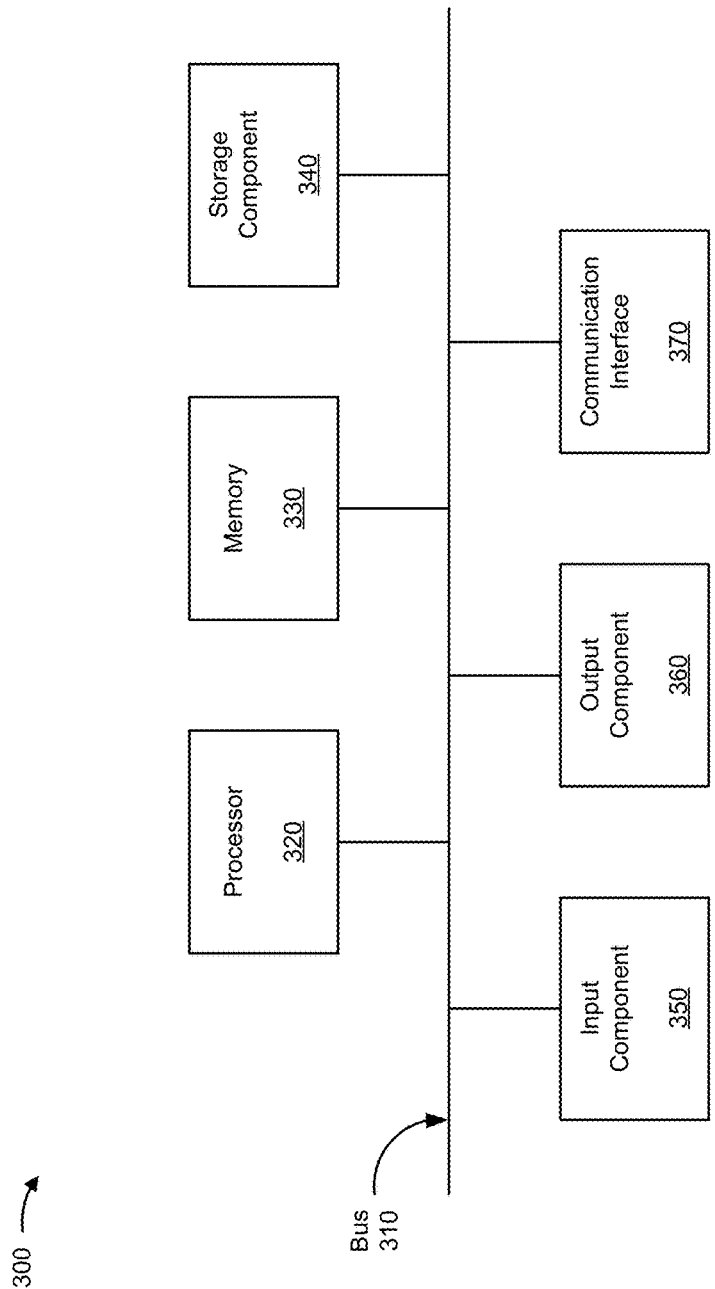
FIG. 3 is a diagram of example components of one or more devices of FIG. 2.

FIG. 3 is a diagram of example components of a device 300. Device 300 may correspond to client device 205, server device 210, and/or trend identification platform 215. In some implementations, client device 205, server device 210, and/or trend identification platform 215 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a processor (e.g., a central processing unit (CPU), a graphics processing unit (GPU), an accelerated processing unit (APU), etc.), a microprocessor, a microcontroller, and/or any processing component (e.g., a field-programmable gate array (FPGA), an application-specific integrated circuit (ASIC), etc.) that interprets and/or executes instructions. In some implementations, processor 320 includes one or more processors that can be programmed to perform a function. Memory 330 includes a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 includes a component that provides output information from device 300 (e.g., a display, a speaker, one or more light-emitting diodes (LEDs), etc.).

Communication interface 370 includes a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A non-transitory computer-readable medium is defined herein as a non-transitory memory device. A memory device includes memory space within a single physical storage device or memory space spread across multiple physical storage devices.

Software instructions may be read into memory 330 and/or storage component 340 from another non-transitory computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
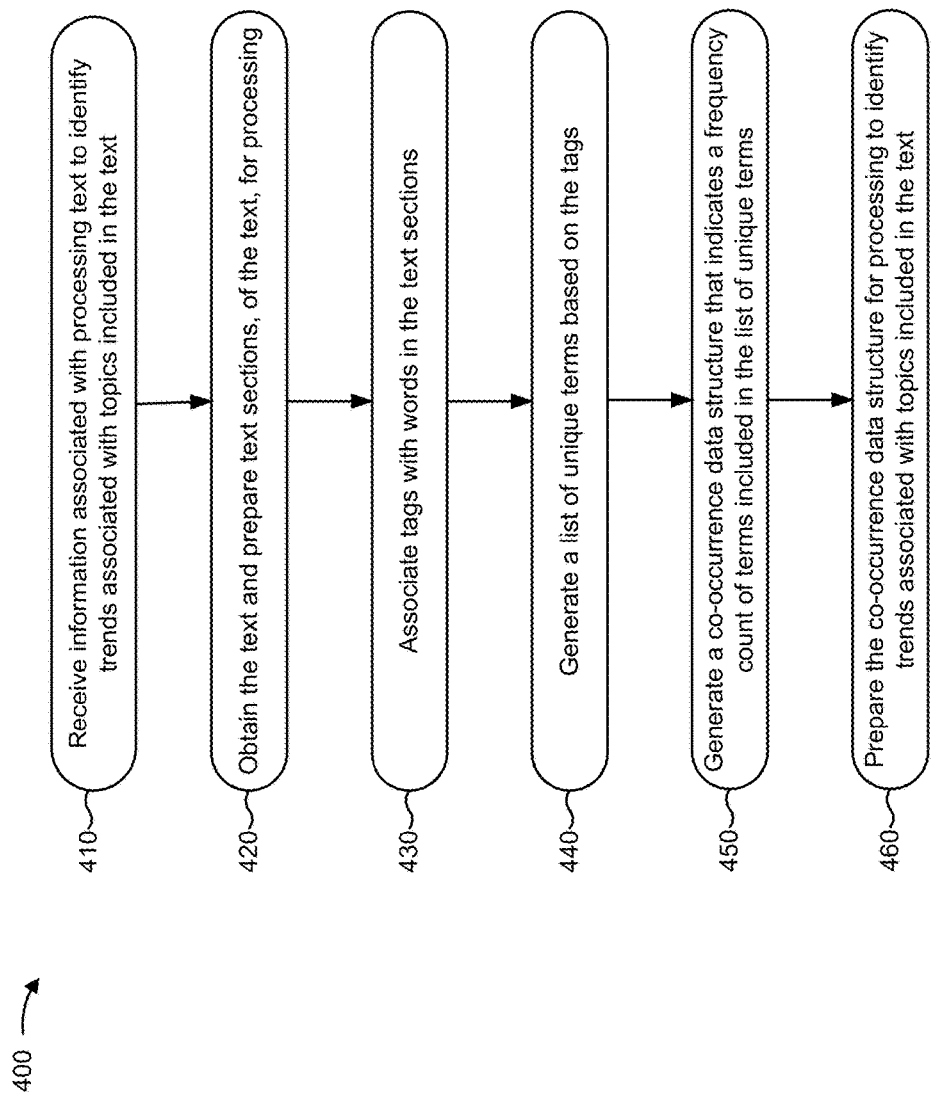
FIG. 4 is a flow chart of an example process for preparing text for processing to identify trends associated with topics included in the text.

FIG. 4 is a flow chart of an example process 400 for preparing text for processing to identify trends associated with topics included in the text. In some implementations, one or more process blocks of FIG. 4 may be performed by trend identification platform 215. In some implementations, one or more process blocks of FIG. 4 may be performed by another device or a group of devices separate from or including trend identification platform 215, such as client device 205 and/or server device 210.

As shown in FIG. 4, process 400 may include receiving information associated with processing text to identify trends associated with topics included in the text (block 410). For example, trend identification platform 215 may receive information that identifies text to be processed, may receive information that identifies a configuration parameter to be used to identify trends associated with topics included in the text, may receive information associated with a trend identification technique to be used to identify trends associated with topics included in the text, or the like.

Trend identification platform 215 may receive, via input from a user and/or another device, information that identifies text to be processed. For example, a user may input information identifying the text or a memory location at which the text is stored (e.g., local to and/or remote from trend identification platform 215). The text may include, for example, a document that includes text (e.g., a text file, a text document, a web document, such as a web page, or a file that includes text and other information, such as images), a group of documents that include text (e.g., multiple files or multiple web pages), a portion of a document that includes text (e.g., a portion indicated by a user or a portion identified by document metadata), and/or other information that includes text. In some implementations, the text may include natural language text. In some implementations, trend identification platform 215 may receive an indication of one or more sections of text to be processed.

In some implementations, the text may include one or more temporal indicators. For example, a temporal indicator may include a timestamp, or the like, and may indicate a time, a date, a time frame, a time interval, a time period, or the like. In some implementations, a temporal indicator may indicate when the text was created, modified, or the like. For example, a temporal indicator may include a date and/or a time associated with the text (e.g., 30 Jun. 2013), and/or may indicate that the text is pertinent to a particular time and/or date. Additionally, or alternatively, a temporal indicator may identify a time period associated with the text (e.g., Quarter 1 (Q1) 2015 or simply 2015). In some implementations, the temporal indicator may be indicated by a user (e.g., based on a user input). In some implementations, trend identification platform 215 may identify a temporal indicator (e.g., identify based on the text and/or metadata associated with the text).

The text may include one or more terms. A term may refer to a set of characters, such as a single character, multiple characters (e.g., a character string), a combination of characters that form multiple words (e.g., a multi-word term, such as a phrase, a sentence, or a paragraph), a combination of characters that form an acronym, a combination of characters that form an abbreviation of a word, a combination of characters that form a misspelled word, or the like. In some implementations, a term may be a topic. For example, a topic may represent a subject, a subject matter, a theme, an issue, a concern, a risk, or the like. Additionally, a topic may be associated with a trend. For example, a trend may indicate an increase, decrease, persistence, reemergence, or the like, in importance of a topic across time frames.

In some implementations, trend identification platform 215 may receive, via input from a user and/or another device, information and/or instructions for identifying terms in the text. For example, trend identification platform 215 may receive a tag list that identifies tags (e.g., part-of-speech tags or user-input tags) to be used to identify terms in the text. As another example, trend identification platform 215 may receive a term list (e.g., a glossary that identifies terms in the text, a dictionary that includes term definitions, a thesaurus that includes term synonyms or antonyms, a lexical database that identifies terms in the text (e.g., single-word terms and/or multi-word terms)).

In some implementations, trend identification platform 215 may receive information that identifies a configuration parameter to be used to identify trends associated with topics included in the text. In some implementations, the configuration parameter may include a text section setting (e.g., selecting a sentence, paragraph, or a page) that is to be used when determining a context for a term and/or identifying trends, as described elsewhere herein. Additionally, or alternatively, the configuration parameter may include an indication of whether to identify words and/or phrases as topics. Additionally, or alternatively, the configuration parameter may include a time frame that specifies a temporal start, a temporal end, and/or a temporal interval to be used to identify trends associated with topics included in the text. Additionally, or alternatively, the configuration parameter may include a list of terms and/or part-of-speech tags which are to be excluded from consideration as topics.

Additionally, or alternatively, the configuration parameter may include an indication of whether a sampling bias is to be applied to a particular time frame, as described elsewhere herein. Additionally, or alternatively, the configuration parameter may include an indication of a quantity of terms preceding and/or following a topic in the text that are to be used when determining a context for a term (e.g., a context window) and/or identifying trends, as described elsewhere herein. Additionally, or alternatively, the configuration parameter may include an indication of a quantity of topics that are to be identified as associated with a particular trend and/or provided for display.

As further shown in FIG. 4, process 400 may include obtaining the text and preparing text sections, of the text, for processing (block 420). For example, trend identification platform 215 may obtain the text, and may prepare the text for processing to identify trends associated with topics included in the text. In some implementations, a user may input information identifying the text or a memory location at which the text is stored. Based on the user input, trend identification platform 215 may retrieve the text. Additionally, or alternatively, client device 205 may provide a user interface via which a user may input text, and trend identification platform 215 may obtain the text based on the information input via the user interface associated with client device 205. The text may include multiple files storing text, a single file storing text, a portion of a file storing text, multiple lines of text, a single line of text, a portion of a line of text, or the like. The text may include untagged text and/or may include tagged text that has been annotated with one or more tags.

In some implementations, trend identification platform 215 may determine text sections, of the text, to be processed. For example, trend identification platform 215 may determine a manner in which the text is to be partitioned into text sections, and may partition the text into text sections. A text section may include, for example, a sentence, a line, a paragraph, a page, a document, or the like. Additionally, or alternatively, trend identification platform 215 may label text sections and may use the labels when processing the text. For example, trend identification platform 215 may label each text section with a unique identifier (e.g., $TS_1$, $TS_2$, $TS_3$, ... $TS_d$, where $TS_k$ is equal to the k-th text section in the text and d is equal to the total quantity of text sections in the text). Additionally, or alternatively, trend identification platform 215 may process each text section separately (e.g., serially or in parallel).

Trend identification platform 215 may prepare the text (e.g., one or more text sections) for processing, in some implementations. For example, trend identification platform 215 may standardize the text to prepare the text for processing. In some implementations, preparing the text for processing may include adjusting characters, such as by removing characters, replacing characters, adding characters, adjusting a font, adjusting formatting, adjusting spacing, removing white space (e.g., after a beginning quotation mark, before an ending quotation mark, before or after a range indicator, such as a hyphen dash, or a colon, or before or after a punctuation mark, such as a percentage sign), or the like. For example, trend identification platform 215 may replace multiple spaces with a single space, may insert a space after a left parenthesis, a left brace, a left bracket, etc., may insert a space before a right parenthesis, a right brace, a right bracket, etc. In this way, trend identification platform 215 may use a space delimiter to more easily parse the text.

In some implementations, trend identification platform 215 may prepare the text for processing by expanding acronyms in the text. For example, trend identification platform 215 may replace a short-form acronym, in the text, with a full-form term that the acronym represents (e.g., may replace "EPA" with "Environmental Protection Agency"). Trend identification platform 215 may determine the full-form term of the acronym by, for example, using a glossary or other input text, searching the text for consecutive words with beginning letters that correspond to the acronym (e.g., where the beginning letters "ex" may be represented in an acronym by "X") to identify a potential full-form term of an acronym, by searching for potential full-form terms that appear near the acronym in the text (e.g., within a threshold quantity of words), or the like.

As further shown in FIG. 4, process 400 may include associating tags with words in the text sections (block 430). For example, trend identification platform 215 may receive information that identifies one or more tags, and may associate the tags with words in the text based on tag association rules. The tag association rules may specify a manner in which the tags are to be associated with words, based on characteristics of the words. For example, a tag association rule may specify that a singular noun tag ("/NN") is to be associated with words that are singular nouns (e.g., based on a language database or a context analysis).

A word may refer to a unit of language that includes one or more characters. A word may include a dictionary word (e.g., "gas") or may include a non-dictionary string of characters (e.g., "asg"). In some implementations, a word may be a term. Alternatively, a word may be a subset of a term (e.g., a term may include multiple words). Trend identification platform 215 may determine words in the text by determining characters identified by one or more delimiting characters, such as a space, a punctuation mark (e.g., a comma, a period, an exclamation point, or a question mark), or the like.

As an example, trend identification platform 215 may receive a list of part-of-speech tags (POS tags) and tag association rules for tagging words in the text with the POS tags based on the part-of-speech of the word. Example POS tags include NN (noun, singular or mass), NNS (noun, plural), NNP (proper noun, singular), NNPS (proper noun, plural), VB (verb, base form), VBD (verb, past tense), VBG (verb, gerund or present participle), VBP (verb, non-third person singular present tense), VBZ (verb, third person singular present tense), VBN (verb, past participle), RB (adverb), RBR (adverb, comparative), RBS (adverb, superlative), JJ (adjective), JJR (adjective, comparative), JJS (adjective, superlative), CD (cardinal number), IN (preposition or subordinating conjunction), LS (list item marker), MD (modal), PRP (personal pronoun), PRP$ (possessive pronoun), TO (to), WDT (wh-determiner), WP (wh-pronoun), WP$ (possessive wh-pronoun), WRB (wh-adverb), etc.

In some implementations, trend identification platform 215 may generate a term corpus of terms to exclude from consideration as topics by generating a data structure that stores terms extracted from the text. For example, trend identification platform 215 may generate a list of terms ExclusionList that stores terms to exclude as topics based on a configuration parameter. Trend identification platform 215 may, for example, identify terms to store in ExclusionList based on a POS tag associated with the word (e.g., VB, VBZ, IN, LS, PRP, PRP$, TO, VBD, VBG, VBN, VBP, WDT, WP, WP$, CD, and/or WRB), based on identifying a particular word or phrase in the text (e.g., provided by a user as a configuration parameter), or the like.

In some implementations, trend identification platform 215 may further process the tagged text to associate additional or alternative tags with groups of words that meet certain criteria. For example, trend identification platform 215 may associate an entity tag (e.g., ENTITY) with noun phrases (e.g., consecutive words with a noun tag, such as /NN, /NNS, /NNP, and/or /NNPS), may associate a term tag (e.g., TERM) with unique terms (e.g., single-word terms and/or multi-word terms). In some implementations, trend identification platform 215 may only process terms with particular tags, such as noun tags, entity tags, verb tags, term tags, or the like, when classifying terms in the text.

As further shown in FIG. 4, process 400 may include generating a list of unique terms based on the tags (block 440). For example, trend identification platform 215 may generate a list of unique terms associated with one or more tags. The list of unique terms (e.g., a term corpus) may refer to a set of terms (e.g., single word terms or multi-word terms) extracted from the text. In some implementations, the term corpus may include terms tagged with a noun tag and/or a tag derived from a noun tag (e.g., an entity tag applied to words with successive noun tags or a term tag). Additionally, or alternatively, the term corpus may include terms identified based on input provided by a user (e.g., input that identifies multi-word terms, input that identifies a pattern for identifying multi-word terms, such as a pattern of consecutive words associated with particular part-of-speech tags, or a pattern of terms appearing at least a threshold quantity of times in the text), which may be tagged with a term tag in some implementations.

In some implementations, trend identification platform 215 may receive information that identifies stop tags or stop terms. The stop tags may identify tags associated with terms that are not to be included in the list of unique terms. Similarly, the stop terms may identify terms that are not to be included in the list of unique terms. When generating the list of unique terms, trend identification platform 215 may only add terms to the list that are not associated with a stop tag or identified as a stop term. Additionally, or alternatively, trend identification platform 215 may only add terms to the list that are not associated with a tag and/or term included in ExclusionList.

Additionally, or alternatively, trend identification platform 215 may convert terms to a root form when adding the terms to the list of unique terms. For example, the terms "process," "processing," "processed," and "processor" may all be converted to the root form "process." Similarly, the term "devices" may be converted to the root form "device." Trend identification platform 215 may add the root term "process device" to the list of unique terms.

Trend identification platform 215 may generate a term corpus by generating a data structure that stores terms extracted from the text, in some implementations. For example, trend identification platform 215 may generate a list of terms TermList of size t (e.g., with t elements), where t is equal to the number of unique terms in the text (e.g., where unique terms list TermList=[term$_1$, term$_2$, . . . , term$_t$]). Additionally, or alternatively, trend identification platform 215 may store, in the data structure, an indication of an association between a term and a tag associated with the term.

As further shown in FIG. 4, process 400 may include generating a co-occurrence data structure that indicates a frequency count of terms included in the list of unique terms (block 450). For example, trend identification platform 215 may generate a term co-occurrence matrix C of size t×d (e.g., with t rows and d columns), where t is equal to the number of unique terms in the text, and where d is equal to the number of unique text sections in the text (e.g., TS$_1$, TS$_2$, TS$_3$, . . . TS$_d$). The co-occurrence matrix C may store an indication of a quantity of times that each term appears in each text section (e.g., in each sentence, where a text section is a sentence). For example, a value stored at C[i,j] may represent a quantity of times that the i-th term (e.g., term$_i$ from TermList) is included in the j-th text section (e.g., TS$_j$).

A single row in co-occurrence matrix C may be referred to as a term vector, and may represent a frequency of occurrence of a single term in each text section. A single column in co-occurrence matrix C may be referred to as a text section vector, and may represent the frequency of occurrence of each term, included in the list of unique terms TermList, in a single text section.

In some implementations, trend identification platform 215 may generate the co-occurrence matrix C based on a particular time frame TF. For example, trend identification platform 215 may generate a term co-occurrence matrix C$_{TF}$ of size t$_{TF}$×d$_{TF}$, where d$_{TF}$ is equal to the number of unique text sections that include temporal indicators within a time frame TF, and where t$_{TF}$ is equal to the number of unique terms from TermList that appear in the unique text sections. In this way, trend identification platform 215 may calculate term frequency-inverse document frequency (tf-idf) scores for one or more terms, as described elsewhere herein.

As further shown in FIG. 4, process 400 may include preparing the co-occurrence data structure for processing to identify trends associated with topics included in the text (block 460). For example, trend identification platform 215 may prepare the co-occurrence data structure for processing by combining alias terms. In this case, trend identification platform 215 may merge two or more rows (e.g., term vectors) in matrix C$_{TF}$. Trend identification platform 215 may merge rows by summing values in the rows that correspond to the same column (e.g., text section vector). For example, trend identification platform 215 may merge a first row and a second row by summing the first value in the first row and the second value in the second row, by summing the j-th value in the first row and the j-th value in the second row, or the like. The summed values may be represented in a single row (e.g., a single term vector), and may be associated with one or more of the terms associated with the merged rows.

Trend identification platform 215 may merge rows based on a syntactic analysis and/or a semantic analysis of the terms associated with the rows. For example, trend identification platform 215 may merge rows based on determining that the terms associated with the rows are misspelled alias terms, short form alias terms, explicit alias terms, or the like. In some implementations, trend identification platform 215 may determine that terms are alias terms based on identifying a pattern in the text (e.g., where terms are linked by an alias phrase, such as "also known as," "also called," "generally known as," or the like). Additionally, or alternatively, trend identification platform 215 may merge rows based on determining that an alias score, which indicates whether two terms are aliases of one another, satisfies a threshold.

In some implementations, trend identification platform 215 may prepare the co-occurrence data structure for processing by applying information theoretic weighting to adjust the values in matrix C$_{TF}$. In this case, trend identification platform 215 may determine an inverse document frequency (idf) factor corresponding to a particular term (e.g., row) and text section (e.g., column) based on the total number of text sections d$_{TF}$ and the number of text sections n$_{TF}$ in which the term appears. For example, the idf factor for a particular term K may be represented as follows:

$$idf_{TF}(K) = \ln\left(\frac{d_{TF}}{n_{TF}+1}\right)$$

In the expression above, the idf factor for the term K may be determined by dividing the number of text sections d$_{TF}$ that include temporal indicators within a time frame TF by the number of text sections n$_{TF}$ that include temporal indicators within the time frame TF and include the term K, and by taking a logarithm of that quotient.

In some implementations, if sampling bias exists for a particular time frame, then the idf factor may be represented as:

$$idf_{TF}(K) = \frac{idf_{TF}(K)}{d_{TF}}$$

For example, the above expression may represent a normalization. A sampling bias may exist for a particular time frame if the time frame is associated with more or fewer text documents than as compared to other time frames.

In some implementations, trend identification platform 215 may apply information theoretic weighting to adjust the values of the co-occurrence matrix as follows:

$$C[i, j] = C[i, j] \times \ln\left(\frac{d_{TF}}{n_{TF} + 1}\right),$$

for each i in t and each j in d.

For example, C[i, j] represents the co-occurrence matrix value (e.g., a frequency quantity) for a particular term in a particular text section, $d_{TF}$ represents the total number of text sections that include temporal indicators within a time frame TF, and $n_{TF}$ represents the number of text sections within the time frame TF that include the particular term. In some implementations, the adjusted values of the co-occurrence matrix may represent tf-idf scores. The tf-idf score for a term may indicate a relative importance of the term as compared to other terms in the text. In some implementations, a first term that is associated with a higher tf-idf score may represent a higher level of risk, and a second term that is associated with a lower tf-idf score may represent a lower level of risk.

While information theoretic weighting has been described above as being applied using a particular technique, trend identification platform 215 may use one or more other techniques to apply information theoretic weighting (e.g., Okapi BM25 or Okapi BM25F). In this way, trend identification platform 215 may generate a co-occurrence data structure, which may be used to identify trends associated with topics included in the text, as described in more detail in connection with FIG. 6.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5A:
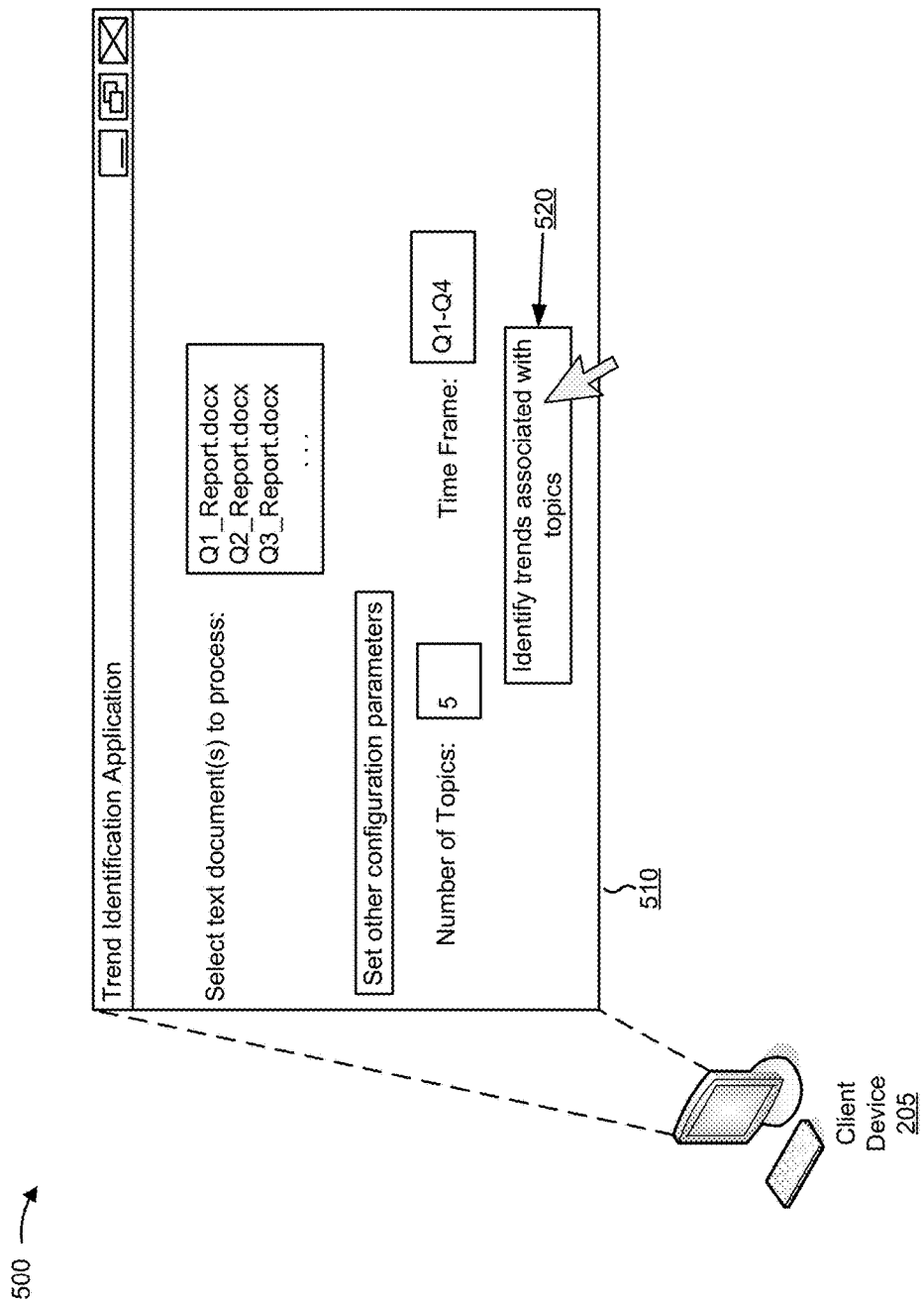
FIGS. 5A and 5B are diagrams of an example implementation relating to the example process shown in FIG. 4.
Figure 5B:
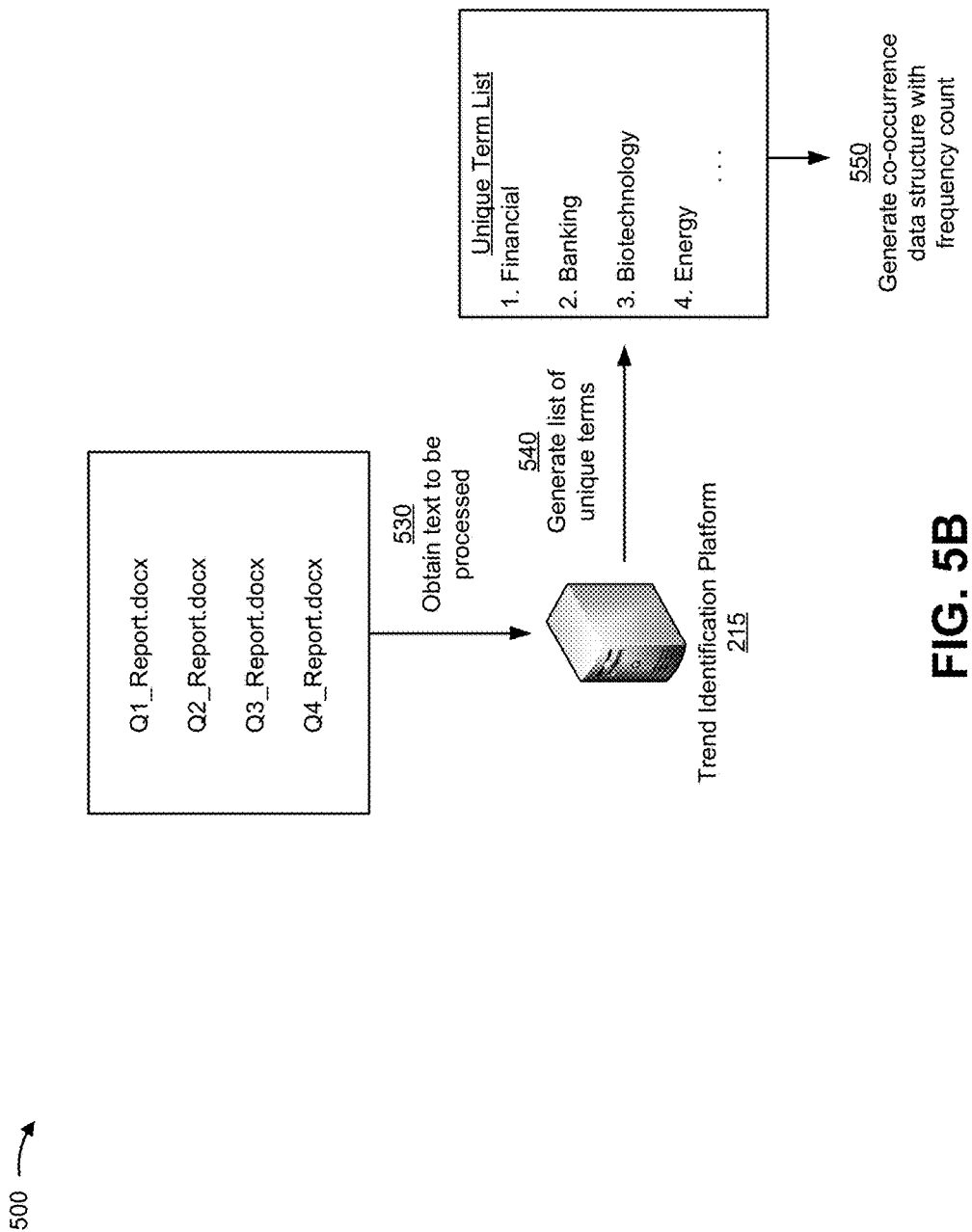

FIGS. 5A and 5B are diagrams of an example implementation 500 relating to example process 400 shown in FIG. 4. FIGS. 5A and 5B show an example of preparing text for processing to identify trends associated with topics included in the text.

As shown in FIG. 5A, and by reference number 510, assume that trend identification platform 215 provides (e.g., for display via client device 205) a trend identification application via which a user may specify options to be applied by trend identification platform 215 when identifying trends associated with topics included in the text. As shown, the user may provide input identifying text to process (e.g., one or more text documents, such as documents entitled "Q1_Report.docx," "Q2_Report.docx," and "Q3_Report.docx") and may provide input identifying one or more configuration parameters associated with identifying trends associated with topics included in the text (e.g., a number of topics to identify as associated with a particular trend and/or a time frame for which to identify trends). As shown by reference number 520, when the user has finished specifying options for processing the text, the user may interact with an input mechanism (e.g., a button or a link) to cause trend identification platform 215 to identify trends associated with topics included in the text.

As shown in FIG. 5B, trend identification platform 215 processes the text based on the user interaction. As shown by reference number 530, trend identification platform 215 obtains the text to be processed based on one or more text documents identified by the user. As shown by reference number 540, trend identification platform 215 processes the text documents to generate a list of unique terms. As shown, assume that trend identification platform 215 determines the following unique terms, among others, from the text documents:

1. Financial
2. Banking
3. Biotechnology
4. Energy

As shown by reference number 550, assume that trend identification platform 215 uses the unique term list to generate a co-occurrence data structure that indicates a frequency count of the terms with respect to text sections, such as separate sentences and/or paragraphs, associated with the text documents. Trend identification platform 215 may apply one or more trend identification techniques to the co-occurrence data structure, as described in more detail elsewhere herein. By generating the list of unique terms and/or the co-occurrence data structure, trend identification platform 215 may process the text more efficiently than if the text were processed without first generating the list of unique terms and/or the co-occurrence data structure, thereby conserving processor and memory resources.

As indicated above, FIGS. 5A and 5B are provided merely as an example. Other examples are possible and may differ from what was described with regard to FIGS. 5A and 5B.

Figure 6B:
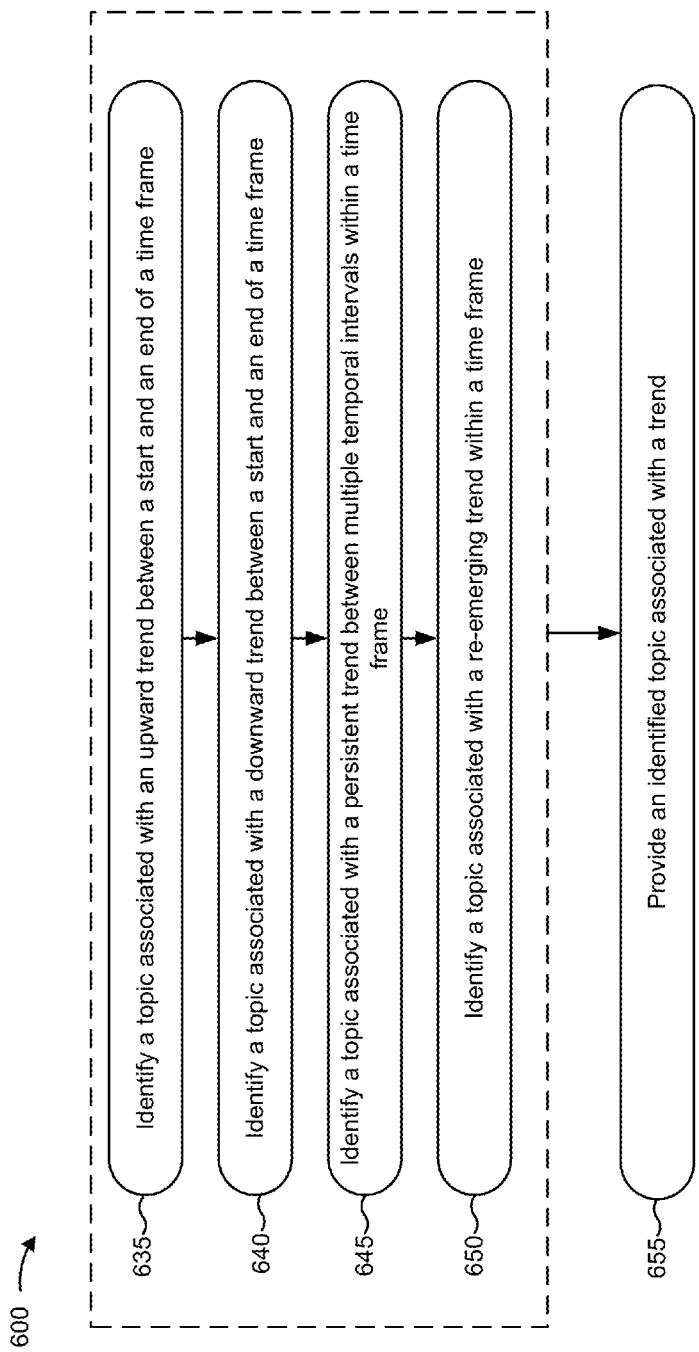

FIGS. 6A and 6B are flow charts of an example process 600 for processing text to identify trends associated with topics included in the text. In some implementations, one or more process blocks of FIGS. 6A and/or 6B may be performed by trend identification platform 215. In some implementations, one or more process blocks of FIGS. 6A and/or 6B may be performed by another device or a group of devices separate from or including trend identification platform 215, such as client device 205 and/or server device 210.

As shown in FIG. 6A, process 600 may include dividing a time frame into temporal intervals (block 605). For example, trend identification platform 215 may divide a time frame into multiple temporal intervals. Trend identification platform 215 may divide a time frame $TF_{S-E}$ into multiple temporal intervals $TI_{1-K}$ such that:

$1^{st}$ temporal interval $TI_1 = [TF_S, TF_S + n]$ $2^{nd}$ temporal interval $TI_2 = [TF_s + 2n, TF_s + 3n]$

...

$k^{th}$ temporal interval $TI_k = [TF_s + (k + 1)n, TF_E]$ where $(k + 1)$ is such that $TF_E > TF_s + kn$ As further shown in FIG. 6A, process 600 may include performing an information content analysis associated with a term for a temporal interval (block 610). For example, trend identification platform 215 may perform an information content analysis by calculating a specificity score associated with a term that indicates a degree to which text sections associated with the term include specific information not included in other text sections.

In this case, a first text section that includes information included in a higher quantity of other text sections would be associated with a lower specificity score (e.g., indicating that the first text section includes less specific information), and a second text section that includes information included in a lower quantity of other text sections would be associated with a higher specificity score (e.g., indicating that the second text section includes more specific information). Additionally, or alternatively, a specificity score may indicate a relative importance of terms included in a particular text section as compared to terms included in other text sections.

In some implementations, trend identification platform 215 may determine, for a particular temporal interval $TI_j$, text sections $TS_{TIj}$ that include temporal indicators within the temporal interval $TI_j$. Additionally, trend identification platform 215 may identify terms $Terms_{TIj}$ from TermList that appear in text sections $TS_{TIj}$. For each particular term in $Terms_{TIj}$, trend identification platform 215 may determine text sections included in $TS_{TIj}$ in which the particular term appears.

In some implementations, trend identification platform 215 may determine a context for a term in a text section. A context may be represented by other terms that appear in a particular text section in which a particular term appears. For example, trend identification platform 215 may determine, based on a configuration parameter, terms that are within a threshold distance (e.g., a quantity of terms preceding and/or following) of the term K in the text section TS (e.g., a context window), and may determine a context based on the terms.

In some implementations, trend identification platform 215 may store a list Context (K, TS, r) that may represent a data structure that stores terms extracted from the text, where K represents a term, TS represents a text section, and r represents a quantity of terms preceding and/or following the term K in the text section TS that are to be extracted and/or used when determining a specificity score for the text section TS. As an example, trend identification platform 215 may store a list associated with the term security from the sentence "Data security is becoming a critical challenge while executing projects" as Context ("Security," Sentence, 2)={data, critical}.

In some implementations, if a term K is a first term in a text section, then r terms following K may be extracted. Additionally, or alternatively, if a term K is a last term in a text section, then r terms preceding K may be extracted. In some implementations, r may include a total quantity of other terms that are included in the text section TS. For example, in the above example, if r is equal to "text section," then trend identification platform 215 may store a list as Context ("Security," Sentence, Sentence)={data, critical, challenge, project}.

In some implementations, trend identification platform 215 may concatenate lists Context (K, $TS_{1-n}$, r) for text sections $TS_{1-n}$ in which the term K appears. For example, trend identification platform 215 may store a list $Context_{overall}$ that includes a quantity of other terms that appear within r terms of K in each text section for a temporal interval $TI_j$. Additionally, or alternatively, trend identification platform 215 may store a frequency count associated with a particular term in $Context_{overall}$.

In some implementations, trend identification platform 215 may calculate, for each particular term in $Terms_{TIj}$, a specificity score for each text section in which the particular term appears. As an example, trend identification platform 215 may calculate a specificity score Info[K, TS] associated with a term K, for a text section TS, as follows:

Info[K, TS, r]=$\Sigma_{k=1}^{t}$ $'C[i,j]$=sum of tf-idf scores for each term in $Terms_{TIj}$ occurring in the text section TS within r terms of K.

In the above expression, C may represent a term co-occurrence matrix (as described elsewhere herein). Additionally, t may represent the quantity of terms in $Terms_{TIj}$, other than the term K, in text section TS, and r may represent a quantity terms preceding and/or following K in the text section TS.

In some implementations, trend identification platform 215 may determine an overall specificity score associated with a term K by summing the specificity scores of each text section in which the term K appears. For example, trend identification platform 215 may determine an overall specificity score as follows:

Info[K, $TS_{TIj}$]=$\Sigma_{TS=1}^{t}$ 'Info [K, TS]=sum of specificity scores for each text section in $TS_{TIj}$ in which the term K appears.

In the above expression, Info[K, TS] may represent a specificity score associated with a term K for a particular text section TS. Additionally, t may represent a quantity of text sections in $TS_{TIj}$ in which the term K appears. In this way, trend identification platform 215 may determine an overall specificity score associated with a term for a particular temporal interval, which may assist trend identification platform 215 in performing a trend analysis as described below.

As further shown in FIG. 6A, process 600 may include performing a trend analysis (block 615). For example, trend identification platform 215 may perform a trend analysis for a term by calculating a trend score that indicates a difference between specificity scores associated with the term between temporal intervals. As an example, trend identification platform 215 may calculate a trend score for a term K as follows:

$$TrendScore(K, TI_{j+1,j}) = Info[K, TS_{TIj+1}] - Info[K, TS_{TIj}]$$

In the above expression, Info[K, $TS_{TIj+1}$] may represent a specificity score associated with the term K for a first temporal interval $TI_{j+1}$, and Info[K, $TS_{TIj}$] may represent a specificity score associated with the term K for a second temporal interval $TI_j$.

In some implementations, trend identification platform 215 may determine, for a set of temporal intervals [$TI_j$, $TI_{j+1}$], a list of terms $Terms_{TIj,j+1}$ from TermList that appear in text sections that include temporal indicators within $TI_j$–$TI_{j+1}$ and may determine trend scores for each respective term in $Terms_{TIj,j+1}$. In this way, trend identification platform 215 may identify trends associated with topics included in the text, as described below.

As further shown in FIG. 6A, process 600 may include identifying a topic associated with an upward trend between temporal intervals within a time frame (block 620). For example, trend identification platform 215 may identify a topic that includes a higher trend score for a subsequent temporal interval than as compared to a prior temporal interval within a time frame. In some implementations, trend identification platform 215 may calculate, for a set of temporal intervals [$TI_j$, $TI_{j+1}$], trend scores for each term in $Terms_{TIj,j+1}$ in a similar manner as described above.

In some implementations, trend identification platform 215 may generate a list TrendScoreList of trend scores associated with terms in $Terms_{TIj,j+1}$, and may rank the trend scores (e.g., in descending order or ascending order). Additionally, or alternatively, trend identification platform 215 may identify a particular percentile of terms (e.g., the top five percent), a particular quantity of terms (e.g., the top five), or the like, from TrendScoreList that include trend scores that include a positive value. In this way, trend identification platform 215 may identify topics associated with an upward trend between temporal intervals within a time frame, and may provide the topics to another device for display, as described elsewhere herein.

As further shown in FIG. 6A, process 600 may include identifying a topic associated with a downward trend between temporal intervals within a time frame (block 625). For example, trend identification platform 215 may identify a topic that includes a lower trend score for a subsequent temporal interval than as compared to a prior temporal interval. In some implementations, trend identification platform 215 may identify a particular percentile of terms (e.g., the bottom five percent), a particular quantity of terms (e.g., the bottom five), or the like from TrendScoreList that include trend scores that include a negative value, and may identify topics associated with downward trends between temporal intervals within a time frame based on the terms.

As further shown in FIG. 6A, process 600 may include identifying a topic associated with a persistent trend between temporal intervals within a time frame (block 630). For example, trend identification platform 215 may identify a topic that includes a similar trend score for a subsequent temporal interval than as compared to a prior temporal interval. In some implementations, trend identification platform 215 may identify terms from TrendScoreList that include trend scores within a range $(-\beta, \beta)$. For example, trend identification platform 215 may calculate $\beta$ as follows:

$$\beta = \frac{S_{max} - S_{min}}{\alpha_{persistent}}$$

In the above expression, $S_{max}$ may represent the trend score associated with the highest value included in TrendScoreList, $S_{min}$ may represent the trend score associated with the lowest value included in TrendScoreList, and $\alpha_{persistent}$ may represent a quantity of terms, that include trend scores including a value within a threshold amount of zero, that may be considered as topics.

Trend identification platform 215 may determine terms that include trend scores within the range $(-\beta, \beta)$, and may store the terms in a list $PersistentList_{TIj,j+1}$. Additionally, for each term included in $PersistentList_{TIj,j+1}$, trend identification platform 215 may determine a score PersistentScore=Info(K,$TI_{j+1}$)+Info(K,$TI_j$), and may store the terms in $PersistentList_{TIj,j+1}$ in ascending or descending order based on the scores. In some implementations, trend identification platform 215 may identify a particular percentile of terms, a particular quantity of terms, or the like from $PersistentList_{TIj,j+1}$ and may identify topics associated with persistent trends between temporal intervals within a time frame based on the terms.

As shown in FIG. 6B, process 600 may include identifying a topic associated with an upward trend between a start and an end of a time frame (block 635). For example, trend identification platform 215 may identify a topic associated with an upward trend between a start and an end of a time frame and/or an upward trend between all temporal intervals associated with the time frame. In some implementations, trend identification platform 215 may identify, for a time frame TF=[$TI_1$,$TI_k$], a list of terms $Terms_{TF}$ that appear in text sections that include temporal indicators within the time frame TF.

In some implementations, trend identification platform 215 may identify topics associated with an upward trend between a start (e.g., $TI_1$) and an end (e.g., $TI_k$) of time frame TF by calculating trend scores for each term in $Terms_{TF}$ as follows:

$$TrendScore(K,TI_{1,k})=Info[K,TS_{TIk}]-Info[K,TS_{TI1}]$$

In some implementations, trend identification platform 215 may generate a list $TrendScoreList_{TF}$ of trend scores associated with terms in $Terms_{TF}$, and may rank the terms based on the trend scores of each respective term. Additionally, trend identification platform 215 may identify a particular quantity, a particular percentile, or the like, of terms in $TrendScoreList_{TF}$ which are associated with trend scores that include a positive value, and may identify topics associated with upward trends between a start and end of a time frame based on the terms.

Additionally, or alternatively, trend identification platform 215 may identify topics associated with upward trends between all temporal intervals within a time frame. For example, trend identification platform 215 may determine, for terms in $TrendScoreList_{TF}$ that include trend scores that include a positive value, trend scores for each successive set of temporal intervals (e.g., [$TI_1$, $TI_2$], [$TI_2$, $TI_3$] . . . [$TI_{k-1}$, $TI_k$]). Trend identification platform 215 may identify terms that include trend scores, for each successive set of temporal intervals, that include a positive value, and may identify topics associated with upward trends between all temporal intervals within a time frame based on the terms. In some implementations, trend identification platform 215 may determine that a topic, that is associated with an upward trend between the start and end of a time frame, is associated with a particular level of risk. For example, the trend score associated with the topic may reflect that concerns associated with the topic have increased throughout the time frame. In some implementations, trend identification platform 215 may permit and/or cause an action to be performed based on identifying a topic associated with an upward trend, as described elsewhere herein.

As further shown in FIG. 6B, process 600 may include identifying a topic associated with a downward trend between a start and an end of a time frame (block 640). For example, trend identification platform 215 may identify a term associated with a trend score at an end of a time frame that is lower than a trend score at a start of the time frame. In some implementations, trend identification platform 215 may identify a particular quantity, a particular percentile, or the like, of terms in $TrendScoreList_{TF}$ that are associated with the lowest trend scores and may identify topics associated with downward trends between a start and an end of a time frame based on the terms. In some implementations, trend identification platform 215 may determine that a topic, that is associated with a downward trend, is not associated with a particular level of risk (e.g., a low trend score may indicate that concerns associated with the topic have been mitigated), and may prevent an action from being performed based on identifying the trend and/or topic.

As further shown in FIG. 6B, process 600 may include identifying a topic associated with a persistent trend between multiple temporal intervals within a time frame (block 645). For example, trend identification platform 215 may identify a topic that includes similar trend scores between multiple temporal intervals within a time frame. In a similar manner as described above in connection with block 630, trend identification platform 215 may identify terms that include trend scores within the range $(-\beta, \beta)$ for each successive set of temporal intervals within a time frame, and may store the terms in a list PersistentList$_{TI1, \, TIk}$. Additionally, for each term included in PersistentList$_{TI1, \, TIk}$, trend identification platform 215 may determine a score PersistentScore=Info(K,TI$_1$)+Info(K,TI$_k$), and may rank the terms in PersistentList$_{TI1, \, TIk}$ based on the scores. In some implementations, trend identification platform 215 may identify a particular percentile of terms, a particular quantity of terms, or the like from PersistentList$_{1,k}$ and may identify topics associated with persistent trends between multiple temporal intervals within a time frame based on the terms. In some implementations, trend identification platform 215 may determine that a topic, that is associated with a persistent trend and that also includes a high specificity score, may pose a particular risk (e.g., concerns associated with the topic may have remained persistent throughout a time frame), and may permit and/or cause an action to be performed based on identifying the trend and/or topic.

As further shown in FIG. 6B, process 600 may include identifying a topic associated with a re-emerging trend within a time frame (block 650). For example, trend identification platform 215 may identify a term that is associated with an upward trend between a start and end of a time frame and is also associated with a downward trend for at least one set of successive temporal intervals within the time frame. In some implementations, trend identification platform 215 may determine a set of terms associated with an upward trend between a start and end of a time frame in a similar manner as described above in connection with block 635. Additionally, trend identification platform 215 may determine terms, from the set of terms associated with the upward trends between the start and end of the time frame, that are also associated with a downward trend between temporal intervals within the time frame in a similar manner as described above in connection with block 625. Trend identification platform 215 may identify a topic associated with a re-emerging trend based on the terms. In some implementations, trend identification platform 215 may determine that topics, associated with re-emerging trends, are associated with a particular level of risk (e.g., concerns associated with the topic may have re-emerged), and may permit and/or cause an action to be performed based on identifying the trend and/or topic.

As further shown in FIG. 6B, process 600 may include providing an identified topic associated with a trend (block 655). For example, trend identification platform 215 may provide (e.g., for display via a user interface of client device 205) identified topics associated with various trends (e.g., upward, downward, persistent, or re-emerging). In some implementations, trend identification platform 215 may provide a particular quantity of topics associated with a particular trend (e.g., based on a configuration parameter), may provide a particular quantity of trends, may provide trend scores associated with the topics, may provide a ranking of the topics, may provide information that identifies a quantity of text sections in which particular topics appear, or the like. Additionally, or alternatively, trend identification platform 215 may provide information that identifies a time frame associated with a trend. Additionally, or alternatively, trend identification platform 215 may provide the identified topics and/or trends to another device.

In some implementations, trend identification platform 215 may permit and/or cause an action to be performed based on identifying a topic associated with a trend. For example, trend identification platform 215 may perform an action and/or may cause another device to perform an action based on identifying a trend associated with a topic. In some implementations, trend identification platform 215 may provide, and/or cause another device to provide, a message to client device 205 based on identifying a topic associated with a trend. For example, trend identification platform 215 may cause a message (e.g., an email or a short message service (SMS) message) to be sent to client device 205 based on identifying a topic associated with an upward trend. In this way, trend identification platform 215 may notify a user that a topic may pose a particular level of risk to an organization, a company, or the like.

Additionally, or alternatively, trend identification platform 215 may coordinate client devices 205 based on identifying a trend associated with a topic. For example, trend identification platform 215 may coordinate client devices 205 (e.g., coordinate calendar applications associated with client devices 205 to schedule a meeting), and may provide information identifying a topic and/or trend (e.g., to be displayed in association with a calendar application). In this way, a user may receive an indication that a meeting has been scheduled to discuss a particular topic that may represent a particular risk.

Additionally, or alternatively, trend identification platform 215 may cause another device (e.g., a network device, such as a firewall) to implement a security measure based on identifying a trend associated with a topic. For example, trend identification platform 215 may cause another device to filter ingress and/or egress traffic that is associated with a topic (e.g., includes a particular source or includes particular information). For example, the other device may inspect network traffic (e.g., perform deep packet inspection (DPI)) and may identify a particular topic included in the network traffic. In this way, trend identification platform 215 may implement security measures in the event of a particular risk.

Additionally, or alternatively, trend identification platform 215 may cause a company policy to be generated and/or updated based on identifying a trend associated with a topic. For example, trend identification platform 215 may identify a topic associated with a particular risk that may be of concern to an organization. In some implementations, trend identification platform 215 may generate and/or update a company policy to accommodate the risk or concern associated with the particular topic. In this way, trend identification platform 215 may assist an organization in establishing rules and/or policies to mitigate particular risks.

Additionally, or alternatively, trend identification platform 215 may cause a budget associated with an organization, company, or the like, to be updated based on identifying a trend associated with a topic. For example, trend identification platform 215 may identify budgetary risks based on identified topics and/or trends, and may cause a budget to be updated to accommodate a particular risk (e.g., may allocate resources towards a risk area or may prevent resources from being allocated towards a particular risk area). Additionally, or alternatively, trend identification platform 215 may cause accounting software to be modified. In this way, trend identification platform 215 may assist an organization or company in managing financial risk based on an identified trend and/or topic.

Additionally, or alternatively, trend identification platform 215 may permit a user to access text associated with an identified topic. For example, trend identification platform 215 may provide information (e.g., for display via client device 205) identifying and/or including text sections that include a particular topic. In this way, trend identification platform 215 may assist a user in assessing risk and/or identifying particular concerns.

Additionally, or alternatively, trend identification platform 215 may cause a financial position to be modified based on an identified topic and/or trend. For example, trend identification platform 215 may cause a market order, a limit order, a stop order, or the like, to be placed regarding a security. For example, assume that a topic (e.g., an industry, an organization, an asset, or a sector) is associated with a particular risk, concern, interest, or the like. In some implementations, trend identification platform 215 may cause a financial position to be modified (e.g., may place an order for a security or may prevent a security from being acquired) based on identifying a trend associated with a topic.

Additionally, or alternatively, trend identification platform 215 may cause a rate to be modified based on identifying a trend associated with a topic. For example, trend identification platform 215 may cause a price of a service, product, or the like, to be modified based on an identified trend. For example, assume that a topic is associated with a particular level of risk, interest, or the like. Trend identification platform 215 may cause a price of a service, product, or the like, associated with the topic to be modified based on the particular level of risk or interest associated with the topic.

Additionally, or alternatively, trend identification platform 215 may prevent a service from being performed in association with a particular area based on identifying a trend associated with a topic. For example, assume that a topic is associated with a particular area, location, venue, or the like. Further, assume that the topic is associated with a particular level of risk (e.g., to a company, organization, or the like, associated with a service). Trend identification platform 215 may prevent a service from being performed (e.g., a transportation service) in association with the particular area, location, or the like.

In this way, trend identification platform 215 may increase the speed and accuracy of trend identification, which may assist a user in identifying trends associated with topics included in text. Additionally, implementations described herein may assist a user in identifying topics that are associated with particular trends for a particular time frame. Implementations described herein may conserve processor and/or memory resources by reducing a quantity of processing needed to perform trend identification.

Although FIGS. 6A and 6B show example blocks of process 600, in some implementations, process 600 may include additional blocks, fewer blocks, different blocks, or differently arranged blocks than those depicted in FIGS. 6A and 6B. For example, although process 600 shows multiple trends associated with topics as being identified, in some implementations, process 600 may include identifying fewer trends. Additionally, or alternatively, two or more of the blocks of process 600 may be performed in parallel. For example, process 600 may include identifying multiple topics associated with various trends in parallel.

Figure 7A:
FIGS. 7A-7C are diagrams of an example implementation relating to the example process shown in FIGS. 6A and 6B.
Figure 7B:
Figure 7C:
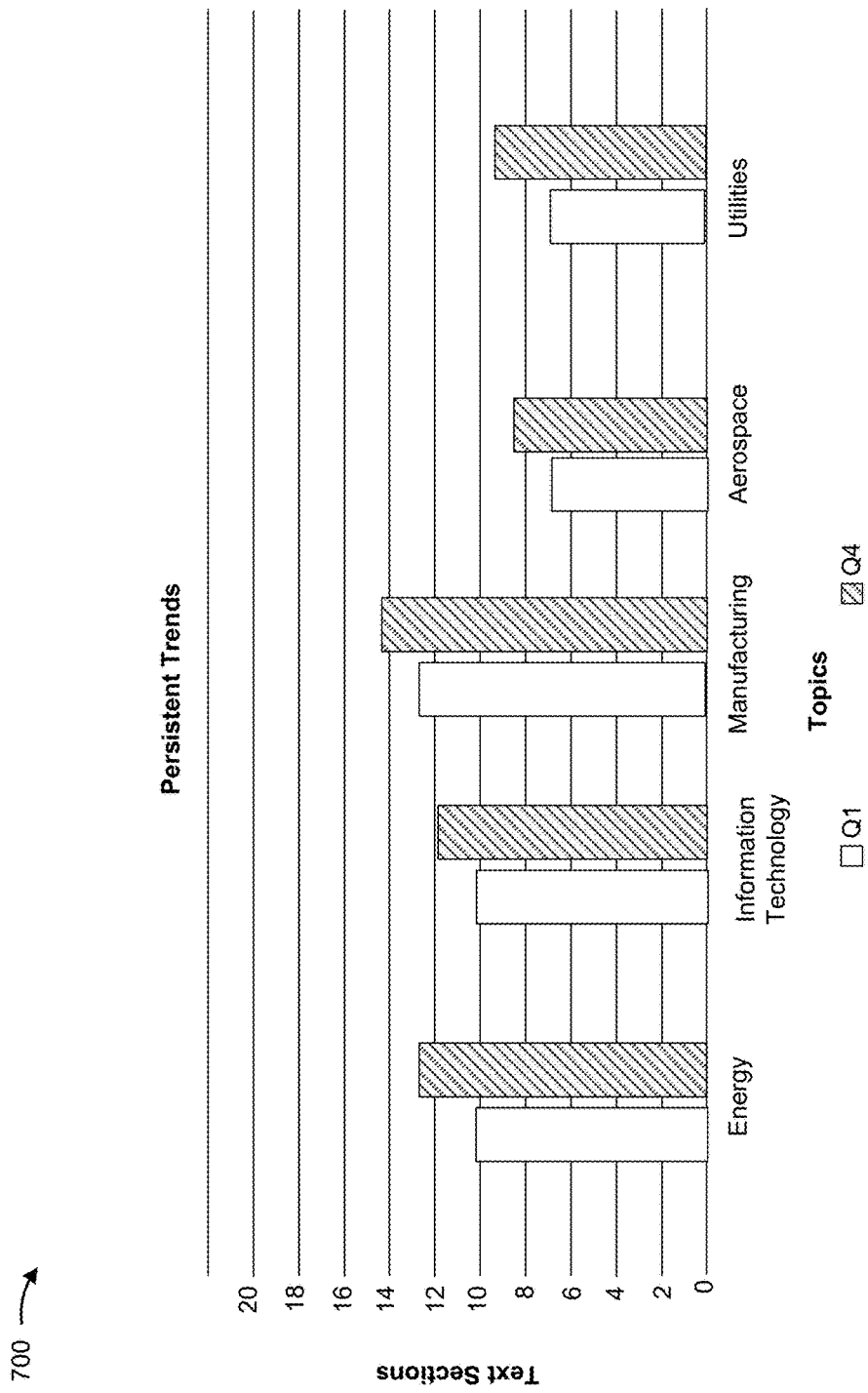

FIGS. 7A-7C are diagrams of an example implementation 700 relating to example process 600 shown in FIGS. 6A and 6B. FIGS. 7A-7C show example outputs based on processing text to identify trends associated with topics included in the text.

As shown in FIGS. 7A-7C, assume that trend identification platform 215 has calculated specificity scores associated with each of the unique terms shown in FIG. 5B. Further, assume that trend identification platform 215 has calculated trend scores associated with each of the unique terms for a time frame (e.g., Quarter 1 (Q1)-Quarter 4 (Q4)).

As shown in FIG. 7A, trend identification platform 215 provides identified topics associated with upward trends between Q1 and Q4. For example, assume that the topics are associated with the highest trend scores for the time frame. Based on the trend scores, trend identification platform 215 provides the topics for display on a user interface (e.g., via client device 205). As shown, trend identification platform 215 provides an indication of a quantity of text sections in which each topic appears.

As shown in FIG. 7B, trend identification platform 215 provides identified topics associated with downward trends between Q1 and Q4. For example, assume that the topics are associated with the lowest trend scores for the time frame. Based on the trend scores, trend identification platform 215 provides the topics on a user interface.

As shown in FIG. 7C, trend identification platform 215 provides identified topics associated with persistent trends between Q1 and Q4. For example, assume that the topics are associated with trend scores that are close to zero. Based on the trend scores, trend identification platform 215 provides the topics on a user interface. In this way, a user may identify topics associated with particular trends for a time frame.

As indicated above, FIGS. 7A-7C are provided merely as an example. Other examples are possible and may differ from what was described with regard to FIGS. 7A-7C.

Implementations described herein may utilize natural language processing to automatically identify trends associated with topics included in text documents, thereby increasing the speed and accuracy of trend identification, thereby conserving processor and/or memory resources. Additionally, implementations described herein may assist a user in identifying topics, and/or trends associated with the topics, that may be of a particular importance to an organization.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
   one or more memories; and
   one or more processors, communicatively coupled to the one or more memories, to:
      obtain text to be processed to identify a trend associated with a topic included in the text,
         the text including a plurality of text sections associated with the topic,
         the plurality of text sections being associated with a plurality of temporal intervals;
      prepare the text for processing,
         the text being prepared by standardizing the text for processing;
      determine a respective context for the topic in each of the plurality of text sections;
      calculate a first specificity score, associated with the topic for a first temporal interval, based on the respective context for the topic for one or more text sections, of the plurality of text sections, associated with the first temporal interval,
         the first specificity score indicating a degree to which text sections associated with the topic include specific information not included in other text sections;
      calculate a second specificity score, associated with the topic for a second temporal interval, based on the respective context for the topic for one or more text sections, of the plurality of text sections, associated with the second temporal interval,
         the plurality of temporal intervals including the first temporal interval and the second temporal interval;
      calculate a first trend score that represents a difference between the first specificity score and the second specificity score;
      calculate a second trend score,
         the second trend score being associated with another topic;
      compare the first trend score and the second trend score;
      automatically identify the trend associated with the topic based on the first specificity score and the second specificity score thereby increasing speed and accuracy of identifying the trend; and
      provide information that identifies the trend associated with the topic to permit an action to be taken based on the trend,
         the information being provided based on a result of comparing the first trend score and the second trend score.

2. The device of claim 1, where the one or more processors are further to:
   determine that the second specificity score is greater than the first specificity score; and
   where the one or more processors, when identifying the trend associated with the topic, are to:
      identify an upward trend associated with the topic based on the second specificity score being greater than the first specificity score.

3. The device of claim 1, where the one or more processors are further to:
   determine that the second specificity score is less than the first specificity score; and
   where the one or more processors, when identifying the trend associated with the topic, are to:
      identify a downward trend associated with the topic based on the second specificity score being less than the first specificity score.

4. The device of claim 1, where the one or more processors are further to:
   determine that a difference between the second specificity score and the first specificity score is within a threshold amount; and
   where the one or more processors, when identifying the trend associated with the topic, are to:
      identify a persistent trend associated with the topic based on the difference between the second specificity score and the first specificity score being within the threshold amount.

5. The device of claim 1, where the one or more processors are further to:
   calculate a third specificity score associated with the topic for a third temporal interval,
      the second temporal interval being subsequent to the first temporal interval,
      the third temporal interval being subsequent to the second temporal interval;
   determine that the third specificity score is greater than the first specificity score;
   determine that the second specificity score is less than the first specificity score; and
   where the one or more processors, when identifying the trend associated with the topic, are to:
      identify a re-emerging trend associated with the topic based on the third specificity score being greater than the first specificity score and the second specificity score being less than the first specificity score.

6. The device of claim 1, where the one or more processors, when determining the respective context for the topic in each of the plurality of text sections, are to:

identify one or more terms that appear within a threshold distance of the topic in each of the plurality of text sections;
calculate a sum of term frequency-inverse document frequency (tf-idf) scores for the one or more terms; and
calculate the first specificity score based on the sum.

7. The device of claim 1, where the text to be processed includes at least one of:
a text file,
a text document, or
a web document.

8. A non-transitory computer-readable medium storing instructions, the instructions comprising:
one or more instructions that, when executed by one or more processors, cause the one or more processors to:
obtain a plurality of text documents to be processed to identify a trend associated with a topic included in one or more of the plurality of text documents,
the plurality of text documents including a plurality of text sections associated with the topic,
the plurality of text sections being associated with a plurality of temporal intervals;
prepare the plurality of text documents for processing,
the text documents being prepared by standardizing the plurality of text documents for processing;
determine a respective context for the topic in each of the plurality of text sections;
calculate a first specificity score, associated with the topic for a first temporal interval, based on the respective context for the topic for one or more text sections, of the plurality of text sections, associated with the first temporal interval,
the first specificity score indicating a degree to which text sections associated with the topic include specific information not included in other text sections;
calculate a second specificity score, associated with the topic for a second temporal interval, based on the respective context for the topic for one or more text sections, of the plurality of text sections, associated with the second temporal interval;
calculate a first trend score that represents a difference between the first specificity score and the second specificity score;
calculate a second trend score,
the second trend score being associated with another topic;
compare the first trend score and the second trend score;
automatically identify the trend associated with the topic based on the first specificity score and the second specificity score thereby increasing speed and accuracy of identifying the trend; and
provide information that identifies the trend associated with the topic to cause an action to be taken based on the trend,
the information being provided based on a result of comparing the first trend score and the second trend score.

9. The non-transitory computer-readable medium of claim 8, where the one or more instructions, when executed by the one or more processors, further cause the one or more processors to:
determine that the second specificity score is greater than the first specificity score; and
where the one or more instructions, that cause the one or more processors to identify the trend associated with the topic, cause the one or more processors to:
identify an upward trend associated with the topic based on the second specificity score being greater than the first specificity score.

10. The non-transitory computer-readable medium of claim 8, where the one or more instructions, when executed by the one or more processors, further cause the one or more processors to:
determine that the second specificity score is less than the first specificity score; and
where the one or more instructions, that cause the one or more processors to identify the trend associated with the topic, cause the one or more processors to:
identify a downward trend associated with the topic based on the second specificity score being less than the first specificity score.

11. The non-transitory computer-readable medium of claim 8, where the one or more instructions, when executed by the one or more processors, further cause the one or more processors to:
determine that a difference between the second specificity score and the first specificity score is within a threshold amount; and
where the one or more instructions, that cause the one or more processors to identify the trend associated with the topic, cause the one or more processors to:
identify a persistent trend associated with the topic based on the difference between the second specificity score and the first specificity score being within the threshold amount.

12. The non-transitory computer-readable medium of claim 8, where the one or more instructions, when executed by the one or more processors, further cause the one or more processors to:
calculate a third specificity score associated with the topic;
determine that the third specificity score is greater than the first specificity score;
determine that the second specificity score is less than the first specificity score; and
where the one or more instructions, that cause the one or more processors to identify the trend associated with the topic, cause the one or more processors to:
identify a re-emerging trend associated with the topic based on the third specificity score being greater than the first specificity score and the second specificity score being less than the first specificity score.

13. The non-transitory computer-readable medium of claim 8, where the one or more instructions, that cause the one or more processors to determine the respective context for the topic in each of the plurality of text sections, cause the one or more processors to:
identify one or more terms, in each of the plurality of text sections, that appear within a threshold distance from the topic; and
where the one or more instructions, that cause the one or more processors to calculate the first specificity score, cause the one or more processors to:
calculate a sum of term frequency-inverse document frequency (tf-idf) scores for the one or more terms to form the first specificity score.

14. The non-transitory computer-readable medium of claim 8, where the action includes providing a message to another device.

15. A method, comprising:
obtaining, by a device, text to be processed to identify a trend associated with a topic included in the text,
the text including a plurality of text sections associated with the topic,
the plurality of text sections being associated with a plurality of time frames;
preparing, by the device, the text for processing,
the text being prepared by standardizing the text for processing;
determining, by the device, a respective context for the topic in each of the plurality of text sections,
the respective context for the topic in each of the plurality of text sections including one or more terms that appear within a threshold distance of the topic;
calculating, by the device, a first specificity score, associated with the topic for a first time frame, of the plurality of time frames, based on the respective context for the topic for one or more text sections, of the plurality of text sections, associated with the first time frame,
the first specificity score indicating a degree to which text sections associated with the topic include specific information not included in other text sections;
calculating, by the device, a second specificity score, associated with the topic for a second time frame, of the plurality of time frames, based on the respective context for the topic for one or more text sections, of the plurality of text sections, associated with the second time frame;
calculating, by the device, a first trend score that represents a difference between the first specificity score and the second specificity score;
calculating, by the device, a second trend score,
the second trend score being associated with another topic;
compare the first trend score and the second trend score;
automatically identifying, by the device, the trend associated with the topic based on the first specificity score and the second specificity score thereby increasing speed and accuracy of identifying the trend; and
providing, by the device, information that identifies the trend associated with the topic to permit an action to be taken based on the trend,
the information being provided based on a result of comparing the first trend score and the second trend score.

16. The method of claim 15, further comprising:
determining that the second specificity score is greater than the first specificity score,
the second time frame being subsequent to the first time frame; and
where identifying the trend comprises:
identifying an upward trend based on the second specificity score being greater than the first specificity score.

17. The method of claim 15, further comprising:
determining that the second specificity score is less than the first specificity score,
the second time frame being subsequent to the first time frame; and
where identifying the trend comprises:
identifying a downward trend based on the second specificity score being less than the first specificity score.

18. The method of claim 15, further comprising:
determining that a difference between the second specificity score and the first specificity score is within a threshold amount; and
where identifying the trend comprises:
identifying a persistent trend based on the difference between the second specificity score and the first specificity score being within the threshold amount.

19. The method of claim 15, where the text is natural language text.

20. The method of claim 15, where providing the information that identifies the trend associated with the topic to permit the action to be taken based on the trend comprises:
providing information that identifies one or more text sections, of the plurality of text sections, associated with topic.

* * * * *